(12) United States Patent
Harrison

(10) Patent No.: US 11,902,464 B1
(45) Date of Patent: *Feb. 13, 2024

(54) CALLER IDENTIFICATION TRUST

(71) Applicant: Wells Fargo Bank, N.A., San Francisco, CA (US)

(72) Inventor: Laurie Harrison, Davidson, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,801

(22) Filed: Nov. 21, 2022

Related U.S. Application Data

(63) Continuation of application No. 17/222,019, filed on Apr. 5, 2021, now Pat. No. 11,509,765, which is a continuation of application No. 16/224,390, filed on Dec. 18, 2018, now Pat. No. 10,992,799.

(51) Int. Cl.
*H04M 15/06* (2006.01)
*H04M 1/56* (2006.01)
*H04M 3/42* (2006.01)
*H04M 7/00* (2006.01)

(52) U.S. Cl.
CPC ..... *H04M 3/42042* (2013.01); *H04M 7/0012* (2013.01); *H04M 7/0036* (2013.01); *H04M 2203/6027* (2013.01); *H04M 2203/6045* (2013.01)

(58) Field of Classification Search
None
See application file for complete search history.

(56) References Cited

U.S. PATENT DOCUMENTS

| | | | |
|---|---|---|---|
| 8,817,961 B1 | 8/2014 | Sterman | |
| 10,149,156 B1 | 12/2018 | Tiku et al. | |
| 10,992,799 B2 * | 4/2021 | Harrison | H04M 3/42042 |
| 11,509,765 B1 * | 11/2022 | Harrison | H04M 3/42042 |
| 2009/0046839 A1 | 2/2009 | Chow et al. | |
| 2009/0217039 A1 | 8/2009 | Kurapati et al. | |
| 2010/0111276 A1 | 5/2010 | Hartley et al. | |
| 2011/0026699 A1 | 2/2011 | Amir et al. | |
| 2013/0019289 A1 | 1/2013 | Gonser et al. | |
| 2015/0150090 A1 | 5/2015 | Carroll et al. | |
| 2015/0236857 A1 | 8/2015 | Feltham et al. | |
| 2017/0104870 A1 | 4/2017 | Mandanapu et al. | |
| 2017/0111498 A1 | 4/2017 | Cody et al. | |
| 2017/0264443 A1 | 9/2017 | Tu et al. | |
| 2018/0103144 A1 | 4/2018 | Gupta et al. | |
| 2018/0278746 A1 | 9/2018 | Yacov et al. | |

* cited by examiner

*Primary Examiner* — Quoc D Tran
(74) *Attorney, Agent, or Firm* — Foley & Lardner LLP

(57) ABSTRACT

Disclosed are example methods, systems, and devices for allowing caller computing devices to authenticate calls via a service provider computing system. Users may opt to have entities register to contact the user with a positive ID, icon, or other notification on the user's computing device transmitted by the service provider computing system. A caller computing device may use a unique security token of the user to activate the notification on the user's device. The user device may be used to exert control over the security token via a service provider client application running on the user device. The caller computing device may initiate authentication via an API call to the service provider computing system. The caller computing device is able to have items (text, images, documents, etc.) delivered to the user computing device if authenticated.

20 Claims, 8 Drawing Sheets

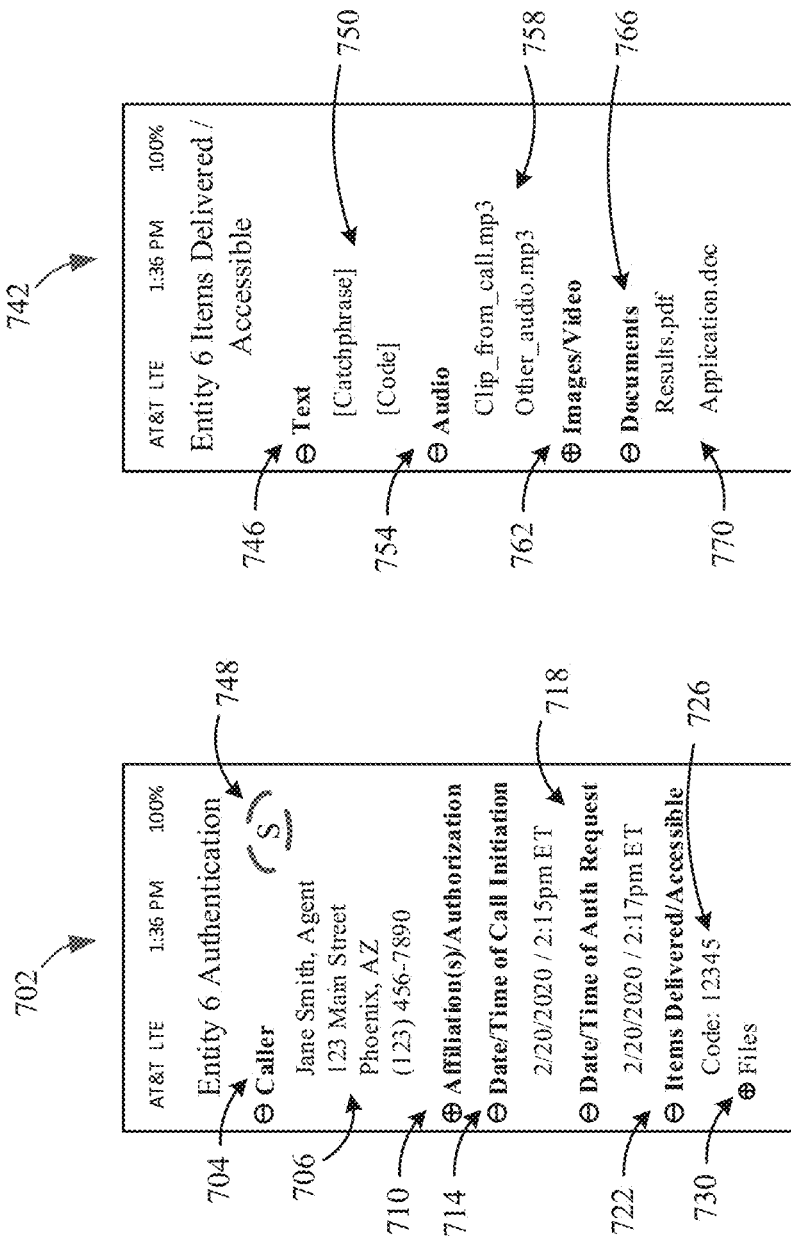

CALLER IDENTIFICATION TRUST

CROSS-REFERENCE TO RELATED APPLICATIONS

This application is a continuation of U.S. patent application Ser. No. 17/222,019, filed on Apr. 5, 2021, which is a continuation of U.S. patent application Ser. No. 16/224,390, filed on Dec. 18, 2018, entitled "Caller Identification Trust," each of which is incorporated herein by reference in its entirety.

TECHNICAL FIELD

The present disclosure relates to systems and methods for verification of unrecognized persons and/or organizations making unsolicited telephone calls and development of trust networks to improve security and enhance detection of suspicious and/or unauthorized calls.

BACKGROUND

"Cold" telephone calls (i.e., unsolicited calls from unrecognized or unknown persons and/or organizations) are made by scammers as well as by trustworthy callers who have legitimate reasons for calling. Such telephone calls leave the call recipient uncertain about whether the caller can be trusted. Caller identification (caller ID) is intended to provide the call recipient with the caller's telephone number, but caller ID spoofing allows deceptive callers to display a phone number different from the caller's actual telephone number. And even in situations in which the telephone number is accurate, the call recipient may not recognize the caller. Moreover, a legitimate caller may be affiliated with a trusted organization (such as a call recipient's physician or financial institution), but if the caller does not recognize the organization (e.g., a laboratory used by the recipient's physician for certain tests, a real estate agent recommended by a mortgage consultant, etc.), the call recipient does not know whether the caller is legitimate.

Conversely, a legitimate caller (such as an agent of a healthcare or financial services provider) may wish to discuss confidential or sensitive matters (such as health or financial records) with a specific person, but the caller first needs to verify that he or she is speaking with the correct person. The caller may not be certain that the correct telephone number was used, and/or that the person being sought is the person who answered the call. Such callers sometimes ask the call recipient to provide certain private information (e.g., birthdate, address, social security number, account numbers, etc.) so that the caller can verify the call recipient's identity before the caller begins discussing the confidential or sensitive matter. However, the call recipient does not know whether the caller can be trusted or is a scammer seeking the confidential information for unauthorized and/or fraudulent uses. The call recipient can refuse to provide the requested information, but this delays or foregoes what could be a time-sensitive or otherwise worthwhile conversation. The caller may choose to hang up and use a known telephone number to call the organization identified by the caller, in hopes of reaching someone who can discuss the matter, but this can be very time consuming and highly inefficient for both the call recipient and the caller. Additionally, legitimate callers expecting call recipients to provide such information to a stranger over the telephone may desensitize their clients/customers to such requests for confidential information, and the clients/customers may be more likely to subsequently fall for a scammer pretending to be a legitimate caller. Such organizations may inadvertently be "training" their customers to give out trusted information to otherwise unknown callers in this way, potentially setting up their customers for fraud in the future.

SUMMARY

Various embodiments of the disclosure relate to a service provider computing system. The service provider computing system may comprise a network interface configured to communicate data via a telecommunications network. The service provider computing system may also comprise a processor and a memory having stored thereon instructions that, when executed by the processor, cause the processor to perform specific operations. The service provider computing system may receive a message transmitted by a caller computing device of a telephone caller. The message may include a credential of the telephone caller and/or an identification of a call recipient. The service provider computing system may also authenticate the credential of the telephone caller. The service provider computing system may moreover validate the identity of the call recipient. The service provider computing system may additionally identify a user computing device associated with the call recipient. The service provider computing system may further transmit an instruction configured to cause generation by the identified user computing device of a perceptible notification. The perceptible notification may be for presentation using one or more interfaces of the user computing device. The perceptible notification may indicate that the identity of the cold caller is verified. The perceptible notification may be transmitted via the network interface.

Various embodiments of the disclosure relate to a method. The method may comprise receiving a message from a caller computing device of a telephone caller. The message may include a credential of the telephone caller and/or an identification of a call recipient. The method may also comprise authenticating the credential of the telephone caller. The method may moreover comprise validating the identity of the call recipient. The method may additionally comprise identifying a user computing device associated with the call recipient. The method may further comprise transmitting an instruction configured to cause generation by the identified user computing device of a perceptible notification. The perceptible notification may be for presentation using one or more interfaces of the user computing device. The perceptible notification may indicate that the identity of the cold caller has been verified.

Various embodiments of the disclosure relate to a non-transitory computer readable medium having machine instructions stored thereon. The instructions may be executable by a processor of a service provider computing system to cause the processor to perform specific operations. The operations may comprise receiving a message from a caller computing device of a telephone caller. The message may include a credential of the telephone caller and/or an identification of a call recipient. The operations may also comprise authenticating the credential of the telephone caller. The operations may moreover comprise validating the identity of the call recipient. The operations may additionally comprise identifying a user computing device associated with the call recipient. The operations may further comprise transmitting an instruction configured to cause generation by the identified user computing device of a perceptible notification. The perceptible notification may be for presentation using one or more interfaces of the user computing device. The perceptible notification may indicate that the identity of the cold caller is verified.

Various embodiments of the disclosure relate to a computing device of a call recipient. The recipient computing device may comprise a network interface configured to communicate data with a service provider computing system via a telecommunications network. The recipient computing device may also comprise one or more user interfaces configured to receive inputs and present perceptible outputs, such as via presentation of graphical user interfaces, sounds, and/or vibrations. The recipient computing device may moreover comprise a processor and a memory having stored thereon a client application (e.g., a service provider client application received via the service provider computing system) configured to cause the processor to perform specific functions. The recipient computing device may be configured to receive notifications from the service provider computing system, directly and/or via a notification service. Notifications, which may be presentable via the one or more user interfaces, may be visual, audible, haptic, or otherwise perceptible. Notifications may indicate that an entity requesting authentication has been verified. Notifications may alternatively or additionally provide an alert indicating that an entity requesting authentication has not been verified and/or that the entity has not been authorized to call the call recipient. Transmission and/or presentation of notifications may require that the service provider computing system and/or the recipient computing device receive a security token. The security token may have been generated by the service provider computing system upon registration with the service provider computing system, via the recipient computing device and/or the caller computing device, for a cold caller ID trust/authentication service provided via the service provider computing system. The security token may be used by the service provider computing system to authenticate/verify the caller and/or the call recipient.

In various implementations, the client application may be configured to present items associated with the entity. The items may be transmitted to the recipient computing device by the service provider computing system for presentation by default when the entity is verified (e.g., without the caller computing device requesting that the item be presented), such as logos, jingles, etc. The items may alternatively or additionally be transmitted to the recipient computing device upon a request received by the service provider computing system from the caller computing device to deliver the items to the recipient computing device. The client application may be configured to perceptibly present, via the one or more user interfaces, information identifying the entity requesting authentication and/or its affiliation with a trusted network, time of call initiation, time of authentication request, text, audio files, image files, video files, documents, and/or other items. One or more items delivered may have been generated prior to initiation of the telephone call, and/or items may have been generated following initiation of the telephone call (such as an audio recording by the caller computing device of a portion of the telephone call).

In various implementations, the client application may be configured to allow the call recipient to deliver items to the caller computing device via the service provider computing system. One or more items delivered may have been generated prior to initiation of the telephone call, and/or items may have been generated following initiation of the telephone call (such as a photograph of a document captured via a camera of the recipient computing device for delivery to the caller computing device).

Various embodiments of the disclosure relate to a computing device of a caller. The caller computing device may comprise a network interface configured to communicate data with a service provider computing system via a telecommunications network. The caller computing device may also comprise one or more user interfaces configured to receive inputs and present perceptible outputs, such as via presentation of graphical user interfaces, sounds, and/or vibrations. The caller computing device may moreover comprise a processor and a memory having stored thereon a client application configured to cause the processor to perform specific functions. The caller computing device may be configured to initiate calls with recipient computing devices. The client application may be configured to present an activatable initiation link which, when activated via the one or more user interfaces of the caller computing device, may cause the processor to initiate a call with the recipient computing device associated with an identified call recipient (via, e.g., a VoIP service). The client application may also be configured to present an activatable authentication link which, when activated via the one or more user interfaces of the computing device, may cause the processor to request authentication via the service provider computing system. Activation of the authentication link may cause the processor to generate and/or deliver a message to the service provider computing system. The message may comprise credentials of the caller, may identify the call recipient, and/or may identify the recipient computing device. The message may also comprise an access token/security token, which may have been generated by the service provider computing system when the caller and/or call recipient registered for a cold caller ID trust/authentication service provided by the service provider computing system. The message may moreover include a device identifier corresponding to the recipient computing device and/or biometric data corresponding to the call recipient. The message may be an API call transmitted by the caller computing device to the service provider computing device.

In various implementations, the client application may also be configured to present a graphical user interface for entry and/or selection of items to be delivered to the recipient computing device via the service provider computing system. Deliverable items may include text, audio, imagery, video, documents, and/or other items. The client application may moreover be configured to present an activatable request affiliation link which, when activated via the one or more user interfaces of the caller computing device, may cause the processor to transmit a request to the service provider computing system to request (via, e.g., a service provider client application running on the recipient computing device) that the caller be affiliated with a trusted network of the call recipient, or that the caller otherwise be authorized to call the recipient computing device. The client application may additionally be configured to present an activatable code generation link which, when activated via the one or more user interfaces of the caller computing device, may cause the processor to generate a code. A code may be generated randomly and/or based at least in part on data corresponding to the call recipient and/or to the recipient computing device. The generated code may then be deliverable to the recipient computing device via the service provider computing system. The code may be spoken by the caller during the call, and presented to the call recipient via the service provider client application to provide assurance that the current caller is the entity authenticated by the service provider computing system. The client application may further be configured to present an activatable record audio link which, when activated via the one or more user interfaces of the caller computing device, may cause the processor to record at least a portion of the telephone call. A recorded audio clip may then be deliverable to the recipient computing device via the service provider computing system. The audio may be presented via the service provider client application to provide assurance that the current caller is the entity authenticated by the service provider computing system.

These and other features, together with the organization and manner of operation thereof, will become apparent from the following detailed description and the accompanying drawings.

BRIEF DESCRIPTION OF THE DRAWINGS

FIG. 7A is a user interface presented by a recipient computing device, according to example embodiments.

FIG. 7B is a user interface presented by a recipient computing device, according to example embodiments.

DETAILED DESCRIPTION

Figure 1:
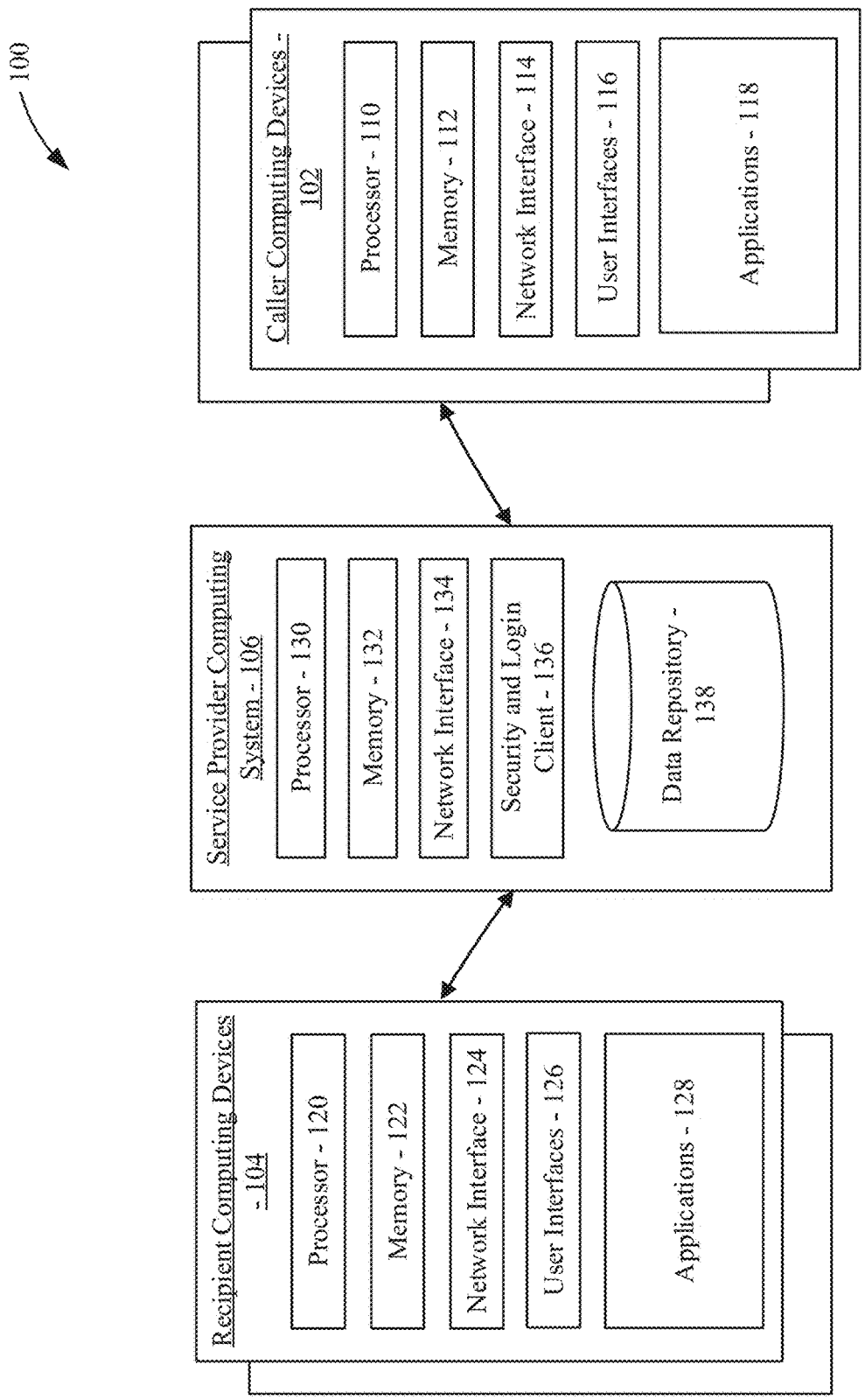
FIG. 1 is a block diagram of a computer-implemented system, with a service provider computing system in communication with devices of call recipients and caller, according to example embodiments.

Various embodiments described herein relate to systems and methods for authenticating telephone calls. Users (also referred to as call recipients) are able to receive confirmation that a caller has been authenticated (and, optionally, has been authorized by the user to call the user) by a service provider computing system. The service provider computing system can transmit push notifications to recipient computing devices, and/or present notifications via client applications running on recipient computing devices, if the caller is authenticated. The service provider computing system can transmit alerts if there is a verification failure. Via a service provider client application, users are able to opt to have entities register to be able to contact the user with a positive ID on the user's mobile phone or other computing device. A caller may be required to utilize a unique token of the user to activate an icon or other perceptible notification (e.g., a pop-up notification, banner, sound, etc.) on the user's computing device. The notification could indicate that the caller has been verified to be who he or she claims to be. Call recipients can more confidently provide private information and/or discuss confidential matters knowing that the caller has been verified. The recipient computing device can be used to exert control over the user's security token, and caller computing devices would only be provided with the security token if the caller computing device has registered, and is in good standing, with the service provider computing system.

In one aspect, a caller computing device may be provided with an application programming interface (API) to allow the caller computing device to authenticate the call with the user. The service provider computing system may provide various functionality to caller computing devices through APIs. Generally, an API is a software-to-software interface that allows a first computing system of a first entity to utilize a defined set of resources of a second (external) computing system of a second (third-party) entity to, for example, access certain data and/or perform various functions. In such an arrangement, the information and functionality available to the first computing system is defined, limited, or otherwise restricted by the second computing system. To utilize an API of the second computing system, the first computing system may make an API call to the second computing system. The API call may be accompanied by a security or access token or other data to authenticate the first computing system and/or a particular user. The API call may also be accompanied by certain data/inputs to facilitate the utilization or implementation of the resources of the second computing system, such as data identifying users, accounts, dates, functionalities, tasks, etc.

The disclosed approach enhances computing security and efficiency in multiple ways. For example, caller ID spoofing technology allows callers to visit a website or launch an application of a spoofing provider, enter the number to be called, and enter the number to be displayed. The spoofing provider may connect the caller to the number to be called through a VoIP service, but with a modified caller ID. The disclosed approach is immune to use of such practices by deceptive scammers, as the call recipient need not trust a caller based on the caller ID number. Call recipients receive more than a potentially dubious identification of the caller as part of caller ID, but authentication of the caller by a service provider computing system (which may be associated with, e.g., a trusted service provider such as the user's financial institution, which is highly incentivized to inspire trust and prevent fraud).

A perceptible presentation (such as a pop-up notification, a banner, a noise, etc.) can be provided by one or more of the user's computing devices, which are known to the service provider computing system, if a positive identification is received from the service provider computing system. The positive identification may be received through a distinct communications channel that is separate from the channel through which the telephone call is received (e.g., VoIP). For example, the service provider computing system may present notifications and alerts via a trusted client application running on the identified user device.

In various implementations, the client application may be a banking application, or an information access control application that allows the user to control how and with whom the user's information is shared. The user is able to view who has access to information, and authorize entities and networks of entities to call, or revoke authorization to call from entities and/or networks, at will. Because the authentication channel is separate from the call itself, a verification notification or alert can be received before a call is initiated, during calls, and/or after a call has been terminated.

In another aspect, a verified caller may deliver additional items (perceptible elements such as text, images, sounds, haptics, documents, etc.) to the call recipient before, during, or after a call. The items received can be deemed to be safe because they are delivered via the service provider computing system only after the caller has been verified. If the items received are not deemed relevant or desirable, the user can revoke authorization for the caller. Authorization can be granted for callers as well as for delivery of items via the client application of the service provider. In various embodiments, authorization can be granted to callers based on association with a trusted network of entities. A caller need not necessarily be authorized specifically and explicitly by a user, but may be deemed authorized by association with a network that has been authorized by the user.

Referring to FIG. 1, a block diagram of a computing system 100 enabling caller identification and trust networks according to example embodiments is shown. The computing system 100 includes a plurality of caller computing devices 102 and recipient computing devices 104 communicating with a service provider computing system 106 via a network (represented by the double-headed arrows in FIG. 1). The service provider computing system 106 may serve as an intermediary system between devices 102 and 104. Devices 102, 104 may include, for example, mobile computing devices (such as smartphones, tablets, laptops, etc.) and/or non-mobile computing devices (e.g., personal computing devices such as desktop computers or workstations). The components of the computing system 100 are communicably and operatively coupled to each other over the network. The network may be any type of type of network. For example, the network may include a wireless network interface (e.g., 802.11X, ZigBee, Bluetooth, Internet, etc.), a wired network interface (e.g., Ethernet, USB, Thunderbolt, etc.), or any combination thereof. The network is structured to permit the exchange of data, values, instructions, messages, and the like between computing devices 102, 104 and the service provider computing system 106.

Each caller computing device 102 includes a processor 110, a memory 112, a network interface 114, and one or more user interfaces 116. The processor 110 may be implemented as a general-purpose processor, an application specific integrated circuit (ASIC), one or more field programmable gate arrays (FPGAs), a digital signal processor (DSP), a group of processing components, or other suitable electronic processing components structured to control the operation of the computing device 102. The memory 112 (e.g., RAM, ROM, NVRAM, Flash Memory, hard disk storage, etc.) may store data and/or computer code for facilitating at least some of the various processes described herein. In this regard, the memory 112 may store programming logic that, when executed by the processor 110, controls the operation of the computing device 102. The network interface 114 may be structured to allow the computing device 102 to communicate data to and from other devices (such as service provider computing system 106) either directly or via the network. The one or more user interfaces 116 may include components that provide perceptible outputs (e.g., displays and light sources for visually-perceptible elements, a speaker for audible elements, and haptics for perceptible signaling via touch), and allow the user to provide inputs (e.g., a touchscreen, stylus, force sensor for, e.g., sensing pressure on a display screen, biometric components such as fingerprint reader, and microphone for detecting ambient sounds). The computing devices 102 include applications 118 (which may include an application provided or authorized by the entity implementing or administering the service provider computing system 106) able to communicate with the service provider computing system 106.

Each recipient computing device 104 includes a processor 120, a memory 122, a network interface 124, and one or more user interfaces 126. The processor 120 may be implemented as a general-purpose processor, an ASIC, one or more FPGAs, a DSP, a group of processing components, or other suitable electronic processing components structured to control the operation of the computing device 104. The memory 122 (e.g., RAM, ROM, NVRAM, Flash Memory, hard disk storage, etc.) may store data and/or computer code for facilitating at least some of the various processes described herein. In this regard, the memory 122 may store programming logic that, when executed by the processor 120, controls the operation of the computing device 104. The network interface 124 is structured to allow the computing device 104 to communicate data to and from other devices (such as service provider computing system 106) either directly or via the network. The one or more user interfaces 126 may include components that provide perceptible outputs (e.g., displays and light sources for visually-perceptible elements, a speaker for audible elements, and haptics for perceptible signaling via touch), and allow the user to provide inputs (e.g., a touchscreen, stylus, force sensor for, e.g., sensing pressure on a display screen, biometric components such as fingerprint reader, and microphone for detecting ambient sounds). The computing device 104 includes applications 128 able to communicate with the service provider computing system 106.

The service provider computing system 106 includes a processor 130, memory 132, and a network interface 134. The processor 130 may be implemented as a general-purpose processor, an ASIC, one or more FPGAs, a DSP, a group of processing components, or other suitable electronic processing components structured to control the operation of the service provider computing system 106. The memory 132 (e.g., RAM, ROM, NVRAM, Flash Memory, hard disk storage, etc.) may store data and/or computer code for facilitating at least some of the various processes described herein. In this regard, the memory 132 may store programming logic that, when executed by the processor 130, controls the operation of the service provider computing system 106. The network interface 134 is structured to allow the service provider computing system 106 to communicate data to and from computing devices 102, 104 either directly or via the network. The computing system 100 may be arranged such that the service provider computing system 106 operates as a server, and computing devices 102, 104 operate as clients. The service provider computing system 106 may include a security and login client 136 which may provide fraud prevention measures and security protections (such as generation of security tokens, authentication of caller and call recipient identities, etc.).

The service provider computing system 106 also includes a data repository 138 that can store information from various internal (i.e., within the same organization or entity) and external (i.e., maintained by other organizations and entities) sources. The data repository can be, for example, one or more databases with structured data, unstructured data, or a combination of structured and unstructured data. The data in the data repository 138 may include data from computing devices 102, 104. In certain versions, some or all of the data may be stored on separate local or remote computing devices that are accessible to, or via, the service provider computing system 106. For example, if the service provider computing system 106 is administered by (or on behalf of)

a financial institution, the data repository 138 may include customer information from the financial account (referred to as an "internal" account) that is stored on a separate system that may be co-located with or remote to the service provider computing system 106.

Figure 2:
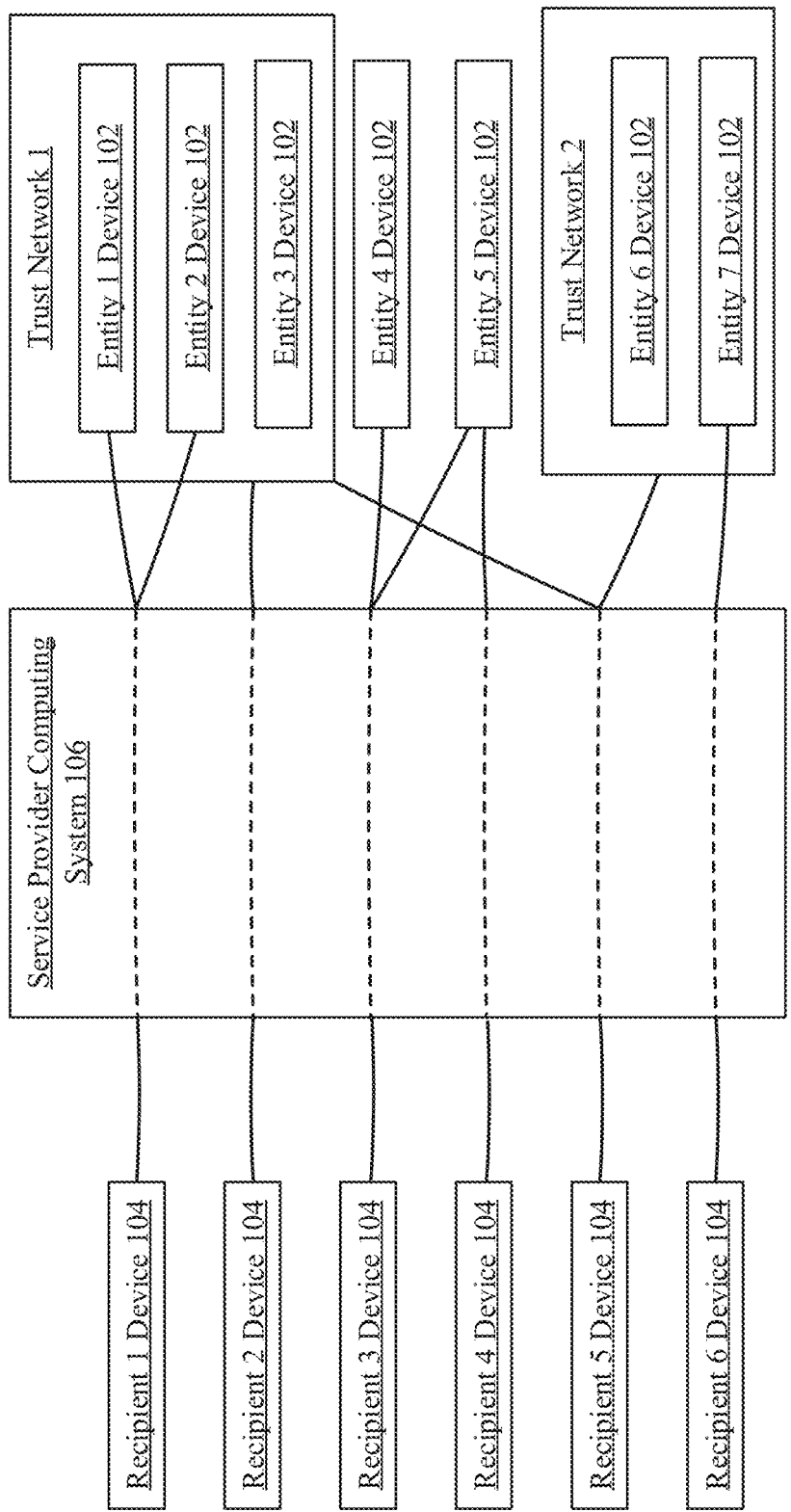
FIG. 2 is a representation of authorizations and trust networks implemented by a service provider computing system, according to example embodiments.

FIG. 2 provides a representation of authorizations and trust networks that allow users to better manage which individual entities and/or which networks of entities can authenticate themselves via the service provider computing system 106, according to various embodiments. In FIG. 2, a set of caller devices 102 of entities 1-7 are associated with a set of recipient devices 102 of recipients 1-6. In some implementations, such associations (represented by the dotted lines) may be maintained in data repository 138.

As depicted in FIG. 2: entities 1 and 2 (both of which are included in trust network 1) may use one or more corresponding caller devices 102 to authenticate themselves with one or more recipient devices 104 of recipient 1; entities in trust network 1 (i.e., entities 1-3) may use one or more corresponding caller devices 102 to authenticate themselves with one or more recipient devices 104 of recipient 2; entities 4 and 5, neither of which is associated with a trust network, may use one or more corresponding caller devices 102 to authenticate themselves with one or more recipient devices 104 of recipient 3; entity 5 (which is not in a trust network) may use one or more corresponding caller devices 102 to authenticate itself with one or more recipient devices 104 of recipient 4; entities in networks 1 and 2 (i.e., entities 1-3, 6, and 7) may use one or more corresponding caller devices 102 to authenticate themselves with one or more recipient devices 104 of recipient 5; and entity 7 (which is in network 2) may use one or more corresponding caller devices 102 to authenticate itself with one or more recipient devices of recipient 6. A call recipient may use one or more recipient devices 104 to authorize one or more individual entities, one or more trust networks, or any combination of entities (whether in a network or not in a network) and trust networks to authenticate themselves using caller devices 102. In example embodiments, service provider computing system 106 maintains trust networks and associations between recipients and entities, and restricts communications between caller devices 102 and recipient devices 104 accordingly.

Figure 3:
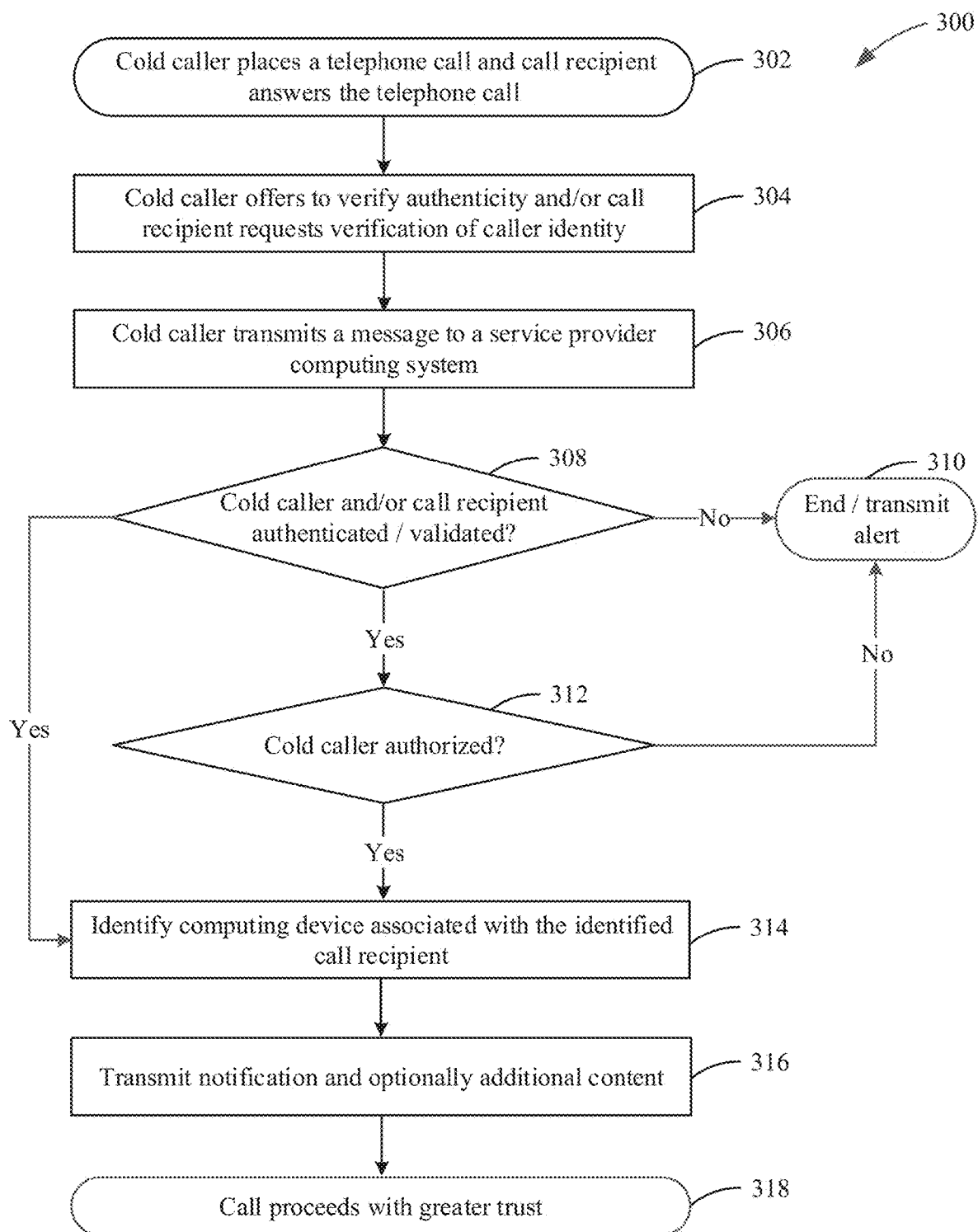
FIG. 3 is a flow diagram for a caller identification method, according to example embodiments.
Figure 8:
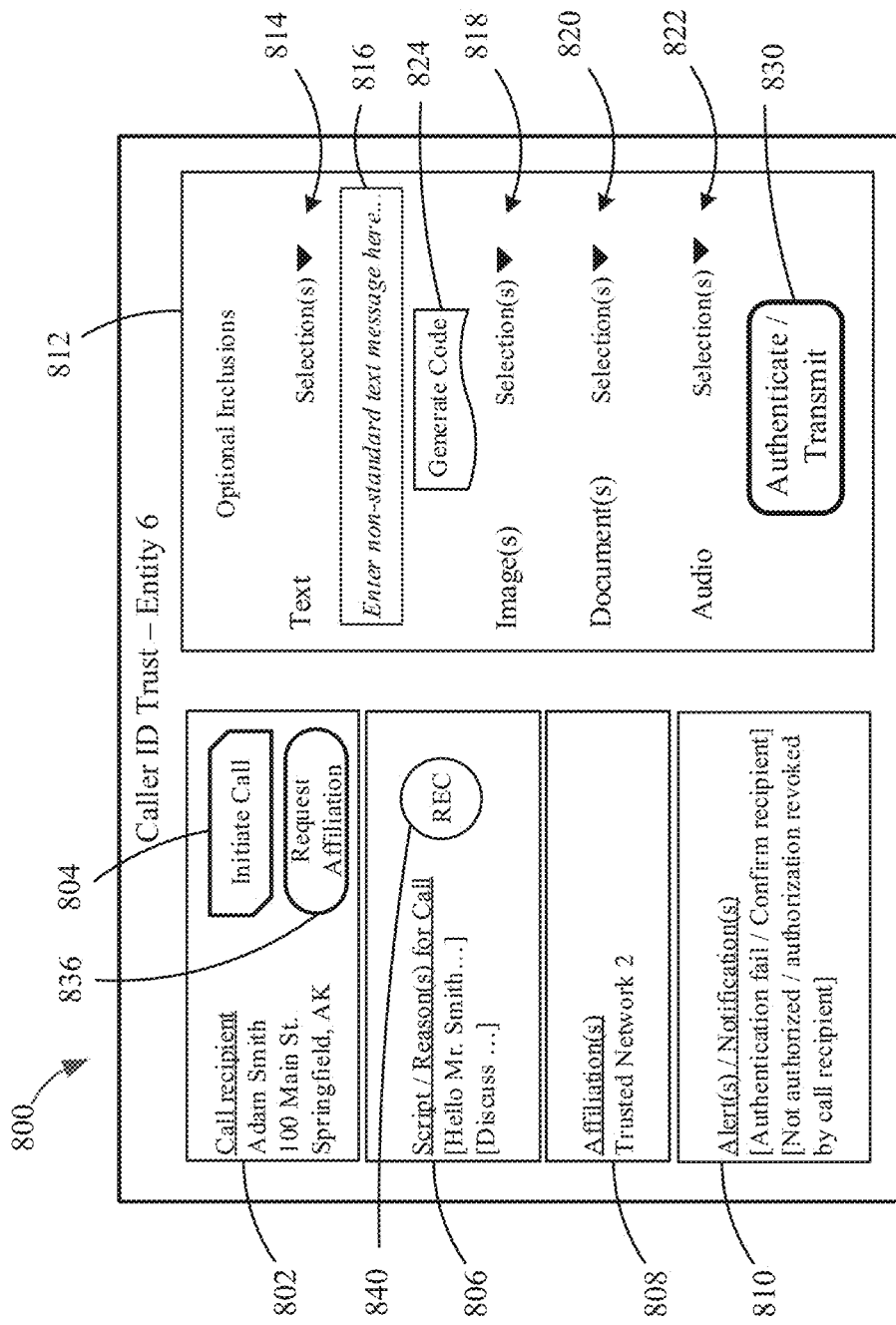
FIG. 8 is a user interface presented by a caller computing device, according to example embodiments.

FIG. 3 is a flow diagram of a method 300 for authenticating a call according to example embodiments. Method 300 begins when a cold caller (i.e., an unknown and/or unexpected caller) places a telephone call to a call recipient, and the call recipient answers the telephone call (302). The telephone call may be made via standard telephone networks or in another manner, such as via internet protocol networks (e.g., as voice over internet protocol, or VoIP, calls). The call may be initiated using a caller computing device 102. FIG. 8, further discussed below, provides an example caller interface 800 presented by a display of a caller device 102. In the user interface of FIG. 8, the call recipient may be identified in a recipient region 802, and the cold caller may initiate a call with the identified call recipient by activating a selectable link presented as part of an initiation graphical user interface (GUI) 804. The call may be answered using a recipient computing device 104, such as a smartphone. In some implementations, the call may be answered using a standard, dedicated telephone that does not have computing capabilities beyond that which is needed for placing and answering telephone calls.

When the call recipient does not already know the caller, the call recipient may doubt whether the caller can be trusted. During the call, the cold caller may offer to verify his or her authenticity, and/or the call recipient may request verification of the caller's identity (304). In some implementations, the cold caller may have a standard call-center script (806 in FIG. 8), which may include an offer to verify identity after, for example, the cold caller introduces himself or herself. Alternatively or additionally, the call recipient may request that the caller verify his or her identity if, for example, the caller requests that the call recipient provide confidential information or if the call recipient otherwise would like to determine whether the caller is authorized and/or legitimate.

If the call recipient accepts the offer from the caller, and/or if the caller accepts the request from the call recipient for authentication, the caller computing device 102 may transmit a message (which may be one or more messages in one or more transmissions in various implementations) to a service provider computing system 106 (306). The message may be transmitted in response to, for example, activation of a selectable link presented as part of an authentication/transmission GUI 830. In various implementations, the message may include credentials of the cold caller and may identify the call recipient. In certain embodiments, the message may include an access token/security token that was generated by the service provider computing system 106 when the caller registered for the cold caller ID trust service provided by the service provider computing system 106. The security token may include, for example, tokenized credentials that are unique to the call recipient and that help to authenticate the caller. In certain implementations, the message may include a device identifier (such as telephone or serial number of a mobile device being called). In various embodiments, the message may include biometric data (e.g., a thumb print, facial recognition, voice signature, etc.) corresponding to the call recipient. In some implementations, the biometric data in the message is accompanied by an identification of the device used to acquire the biometric data. The device used to acquire the biometric data may be different from the device being called, in which case the message may include multiple device identifiers (e.g., one for the device being called, and another for the device used to acquire the biometric data). In some implementations, the device identifier(s) and/or biometric data may be incorporated into the security token. As further discussed below, the device identifier(s) and/or biometric data may be used by the service provider computing system 106 to, for example, verify the identity of the call recipient (308, 408), and/or to know which device should receive a notification (314, 410). In various embodiments, the message is an API call, made by the caller computing device 102, to the service provider computing device 106.

In certain implementations, the caller computing device 102 may allow for selection of particular items to be transmitted by the service provider computing device 106 to the recipient computing device 104. For example, an optional inclusions GUI 812 may allow the caller to select text 814, enter non-standard text 816, select images 818, select documents 820, audio 822, and/or select other items for delivery to the recipient computing device 104. In certain implementations, if the cold caller has made one or more selections via optional inclusions GUI 812, when the link in GUI 830 is first selected, the caller computing device 102 transmits the selected items to the service provider computing system 106. In some implementations, one or more items are already available to or retrievable by the service provider computing system 106 (e.g., stored in data repository 138, or accessible at another computing device associated with the caller or at a third-party computing system). In such versions, the caller computing device 102 may identify such items (by, e.g., reference number) in a transmission to the service provider computing system 106 without including the items themselves in the transmission. In some embodiments, the optional inclusions are in addition to certain default items, such as a logo of the caller. In certain implementations, the optional inclusions may be specific to the call recipient, such as an image pre-selected by the call recipient during registration, an account number of the call recipient, etc.

After the link in GUI 830 has been selected the first time (with or without optional inclusions), the link in GUI 830 may be removed, grayed out, deactivated, or otherwise made not selectable. In some implementations, the link in GUI 830 may be reactivated (such that, e.g., it is once again selectable during or after the call) if the caller makes a selection in optional inclusions GUI 812. The items selected via optional inclusions GUI 812 may be transmitted to the service provider computing system 106 as part of the transmission of the message (the API call) or as a separate, subsequent transmission (e.g., as part of another API call or as part of another type of message).

The service provider computing system 106 of the intermediary trust broker may then authenticate the cold caller credentials (308). If the service provider computing system 106 fails to authenticate the cold caller, the process may end (310). In various embodiments, the service provider computing system 106 may transmit an alert to one or more recipient computing devices 104 (which may be the recipient computing device 104 used to answer the call, or may alternatively or additionally be another recipient computing device 104 of the call recipient), such as the device corresponding to the device identifier received in the message, or another device known (in, e.g., data repository 138) to be associated with the call recipient identified in the message from the caller computing device 102, if authentication fails. The alert to the recipient computing device 104 may indicate, for example, that the caller is not authenticated. In some implementations, the alert is a notification delivered via a service provider client application 128 running on the recipient device 104. In certain implementations, the alert is a notification pushed to the recipient computing device 102 for delivery outside of the service provider client application 128. In various implementations, the service provider computing system 106 may alternatively or additionally transmit an alert to the caller computing device 102 to indicate that the service provider computing system 106 experienced an authentication failure. In some implementations, alerts may be presented by the caller computing device 102 via an alert GUI 810.

Additionally, the service provider computing system 106 may also validate the identity of the call recipient (308). Validation of the identity of the call recipient may include, for example, confirmation that the call recipient is registered with the service provider computing system 106 for the caller ID trust services. In some implementations, validation includes determining that the security token from the caller computing device 102 is valid. In certain versions, validation may alternatively or additionally include use of biometric data to verify the call recipient's identity. The biometric data may have been provided as part of the message from the caller computing device 102 to the service provider computing system 106, and in some implementations, may have been incorporated into the security token. In some versions, validation of the identity of the call recipient may alternatively or additionally include determining that the device identifier received as part of the message from the caller computing device 102 is associated with the call recipient (e.g., to confirm that a telephone number being used is known to be a telephone number of the call recipient). If the service provider computing system 106 fails to validate the identity of the call recipient, the process may end (310). In various implementations, the service provider computing system 106 may transmit an alert to the caller computing device 102 to indicate a likely user misidentification. In some implementations, failure to validate the identity of the call recipient may trigger a responsive message to the caller computing device 102 requesting confirmation of user identification. Such alerts may be presented by the caller computing device 102 via the alert GUI 810.

Optionally, if the cold caller and/or call recipient are authenticated/validated at 308, the service provider computing system 106 may determine whether the call recipient has authorized communications from the caller (312). A caller may be authorized explicitly, such as by naming an organization or person. In various embodiments, callers may also be authorized by type or category of enterprise (e.g., healthcare facilities, real estate companies, etc.), or by relationship to an authorized entity (e.g., an approved affiliate of a financial institution). A caller may also request that the user authorize the caller. The request for authorization may be transmitted to the recipient computing device 104 by the service provider computing system 106, which can notify the recipient computing device 104 of the request via, for example, the service provider client application (see entity entry 570 in the user interface of FIG. 5B).

In certain implementations, a lack of authorization may end the process (310). Alternatively or additionally, lack of authorization may cause an alert (e.g., transmitted by the service provider computing system 106 to the recipient computer device user 104 corresponding to the device identifier received from the caller computing device 102 in the message from the caller computing device 102, or to another device known (in, e.g., data repository 138) to be associated with the call recipient identified in the message, to indicate that he or she may have received a call from an unauthorized party. In certain implementations, a lack of authorization may additionally or alternatively cause transmission by the service provider computing device 106 of a warning message to the caller computing device 102 signaling an improper use of the trust network. In some implementations, the lack of authorization may alternatively or additionally result in documenting of an improper use of trust network. In some implementations, the lack of authorization may alternatively or additionally trigger a penalty to the caller for improper use of the trust network. Authorization may be lacking because, for example, the entity was never granted authorization (directly or via membership in a trust network that is authorized by the call recipient), or because the authorization has been revoked by the call recipient.

The service provider computing system 106 may then identify a recipient computing device 104 (e.g., a smartphone) that is associated with the call recipient (314). In certain implementations, the recipient computing device 104 may be identified (314) following successful authentication/validation of the cold caller and/or call recipient (308), without (the optional step of) determining whether the cold caller is authorized (312). Step 312 may be skipped if, for example, the call recipient has not placed restrictions on who may call. In other implementations, the recipient computing device 104 may be identified (314) after determining that the cold caller is authorized (312). In some implementations, the recipient computing device 104 may be selected during registration of the call recipient, or as a result of a prior relationship of the call recipient with the service provider (e.g., an account administered by the service provider computing system 106). In certain implementations, the recipient computing device 104 may be identified based at least in part on the device identifier received in the message from the caller computing device 102.

In certain versions, the recipient computing device 104 may be confirmed to be a device of the correct user (or otherwise to be currently in the possession of the call recipient being sought) by acquiring biometric data (e.g., a thumb print, facial recognition, voice signature, etc., acquired via one or more user interfaces 126 of recipient computing device 104) to verify the user's identity. The acquired biometric data may be compared with biometric data received by the service provider computing system 104 from the caller computing device 102 (e.g., in the message) or otherwise separately acquired via a computing device of the call recipient (e.g., during registration and saved in data repository 138). In some implementations, the recipient computing device 104 may be identified by selecting the device used to acquire the biometric data, which may have been identified by the caller computing device 102 (e.g., in the message) or by the service provider computing system 104 (e.g., when biometric data was previously acquired).

The service provider computing system 106 may subsequently transmit a notification to the identified recipient computing device 104 (316) to confirm that the service provider computing system 106 has verified the identity of the caller. The notification may be an in-app notification (e.g., viewable within an application 128 made available by the service provider computing system 106 and running on the recipient computing device 104), or it may be a push notification transmitted to the recipient computing device 104 (directly or via a notification service, such as Google Cloud Messaging, Amazon Simple Notification Service, or Apple Push Notification Service) for delivery outside of the application 128 made available by the service provider computing system 106. In some implementations, an icon or other indicator informs the user that there is a notification, and a code, credential, biometric reading, or other input is required to view or otherwise unlock the content of the notification. In various embodiments, the notification, when viewed, may display the identity of the verified party (so the user can confirm that the verified party is the cold-caller).

In various embodiments, the call recipient may be presented with a call verifier to help verify for the call recipient that the caller who initiated the telephone call (i.e., the entity with which the call recipient is speaking) is the same as the entity who has verified its identify via the service provider computing system 106. In some implementations, the call verifier may be provided as additional content at step 316. The call verifier may be, for example, a code spoken by the call recipient and/or by the caller. For example, the call recipient may speak a catchphrase or an alphanumeric code, and the caller may enter the catchphrase or code into optional inclusions GUI 812 (e.g., at 816). Additionally or alternatively, the caller may present a call verifier to the call recipient on the telephone call, and provide that same verifier to the call recipient via the service provider computing system 106. For example, the caller may speak a catchphrase or an alphanumeric code and also deliver what was spoken via optional inclusions GUI 812. The code or catchphrase may be chosen by the caller. In some implementations, a code generation icon 824 may be used to generate a code (e.g., a random code or phrase, or a portion of an alphanumeric number associated with the call recipient, such as a portion of the call recipient's driver's license number). In some implementations, the generated code may be automatically entered into text box 816 and/or the generated code may be inserted into code generation icon 824 (e.g., replacing the words "Generate Code") for delivery via the link in GUI 830. The generated code may then be spoken by the caller and also delivered to the recipient computing device 104 to confirm that the caller with whom the call recipient is speaking is also the caller who is verifying his or her identity via the service provider computing system 104. In various versions, the caller may additionally or alternatively record an audio segment (via, e.g., record GUI 840) of the telephone call, and deliver the recorded audio segment (as, e.g., an audio file accompanying or to be played with the notification, or otherwise made available to the call recipient, such as by accessing a client application of the service provider running on the recipient computing device 104). For example, the caller computing device 102 may record a statement from the call recipient (such as the call recipient reciting the time and/or date) and deliver the recording to the recipient computing device 104 so that the call recipient hears his or her own voice on the recording received from the service provider computing system 106 to demonstrate that the caller is the entity which submitted the authentication request that resulted in the notification from the service provider computing system.

Similarly, the caller may deliver an item previously provided by the call recipient to the caller and identified during the telephone call (e.g., a signed document or a selected image) to help assure the call recipient that the speaker is the entity authenticated by the service provider computing system 106. Advantageously, if two cold callers (e.g., a first entity who is an unwanted telemarketer and a second entity who is a legitimate, authorized caller) are trying to reach the same call recipient in the same timeframe, the call recipient can be assured that an authentication notification corresponds with the correct caller. For example, authentication of the second entity would not be interpreted as authentication of the first entity even if the first entity initiates the telephone call before the second entity (such as situations in which the call recipient is already on the telephone with the first entity when the second entity submits an authentication request).

The notification may include an authorized logo, approved text, or other symbol that has been stored ahead of time by the service provider computing system 106. Alternatively or additionally, the notification may include an audible, haptic, or other component. In some implementations, the recipient computing device 104 may indicate that the caller has been authenticated by playing a sound, such as a sound associated with the service provider or the caller, and/or a sound selected by the call recipient. Optionally, the notification may display additional content, such as the category of the cold caller (e.g., type of business enterprise or industry), advertising materials from the cold caller, optional inclusions, etc. The call may then proceed with greater trust (318).

Figure 4:
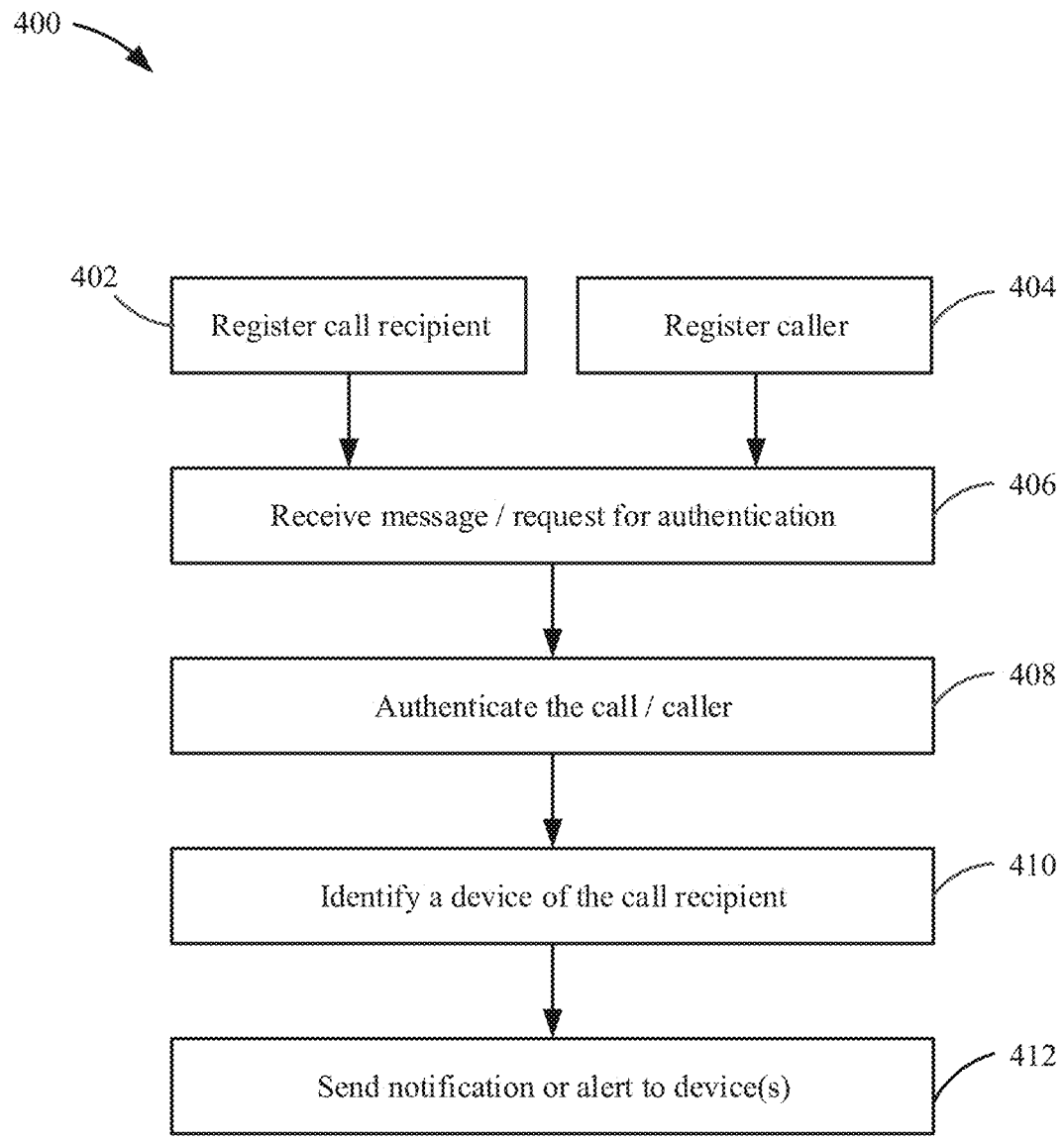
FIG. 4 is a flow diagram of a caller identification method implemented by a service provider computing system, according to example embodiments.

FIG. 4 is a flow diagram of a method 400 for authenticating a call according to example embodiments. Method 400 may be performed by the service provider computing system 106. Method 400 begins with the service provider computing system 106 registering the call recipient (402) and the caller (404). Registration may occur via an application or website of the service provider. Registration requests may be separately transmitted by a caller computing device 102 and a recipient computing device 104 and are received at the service provider computing system 106 (via, e.g., a website or application provided by the service provider computing system). The registration request may include an indication that the call recipient/caller wishes to sign up to use the caller ID trust services provided by the service provider computing system 106. When registering a cold caller, the service provider computing system 106 may generate a unique security/access token. The security token may be used by the caller computing device 102 for authenticating the caller computing device 102 when, for example, making API calls to the service provider computing system 106.

In some arrangements, the registration request may include an indication that the call recipient/caller is already a customer of the service provider (e.g., an account holder). The service provider computing system 106 determines whether the call recipient is an existing account holder. When the call recipient is an account holder with the service provider, the call recipient may not be required to provide as much information to the service provider computing system 106 during the registration process as when the call recipient is not an existing account holder with the service provider.

During a call, the service provider computing system 106 may receive from the caller computing device 102 a request for authentication. In certain embodiments, the request is a message (e.g., an API call) from the caller computing device 102 transmitted in response to selection of the authenticate/transmit link in GUI 830. In various embodiments, the service provider computing system 106 may receive the request before the call is initiated. For example, the caller may select the authenticate/transmit link in GUI 830 before selecting the call initiation link in GUI 804. The service provider computing system may then authenticate the call (408), identify a device of the call recipient (410), and transmit notifications and/or alerts (412) as discussed above and further discussed below.

Figures 5A, 5B:
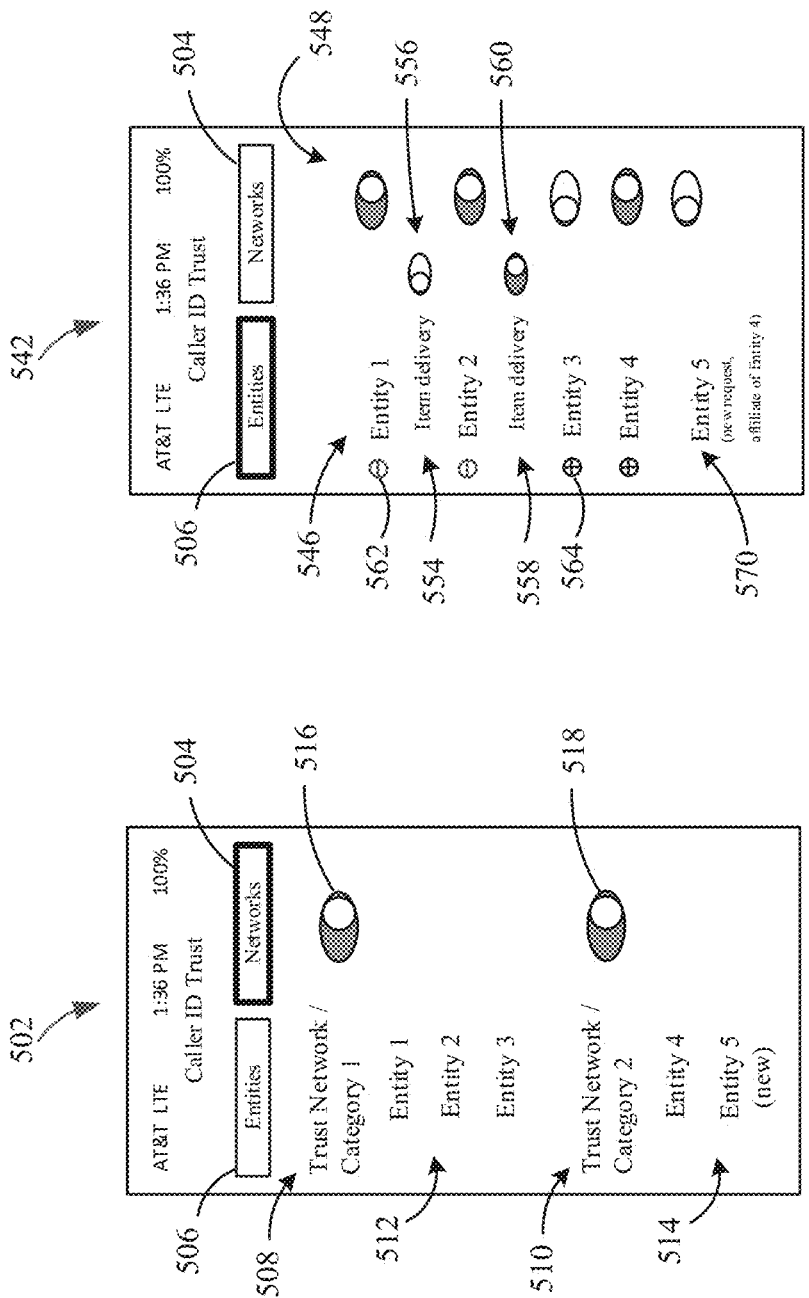
FIG. 5A is a user interface presented by a recipient computing device, according to example embodiments.
FIG. 5B is a user interface presented by a recipient computing device, according to example embodiments.

Referring to FIG. 5A, a caller ID trust user interface 502 is shown according to example embodiments. The user interface 502 is shown as a display on the recipient computing device 104. The user interface 502 includes a networks toggle 504 and an entities toggle 506. As shown by the bolded outline of the networks toggle 504, the networks toggle 504 is selected in FIG. 5A. Accordingly, the user interface 502 is a networks level user interface. While in the networks level user interface 502, the call recipient can view trust networks that may be authorized to contact the call recipient. Association with a trust network may be based on, for example, a category (e.g., business type or type of affiliation among entities, such as business partners, subcontractors, etc.) to which the entities in the trust network belong.

As shown in FIG. 5A, two trust networks (508 and 510) are shown, with corresponding entities (512 and 514, respectively). In user interface 502, entities 1, 2, and 3 are associated with trust network 1, and entities 4 and 5 are associated with trust network 2. User interface 502 provides general toggle switches 516 and 518 to allow the call recipient to authorize (activate, enable, turn on, etc.) or de-authorize (deactivate, disable, turn off, etc.) callers by their association with trust network 1 and 2, respectively. In user interface 502, both trust networks are shown as being authorized. As indicated by its "new" designation (at 514), entity 5 has been newly added to or otherwise listed under trust network 2. The trust network 2 may have been automatically formed or designated by service provider computing system 106 in response to a request by entity 5 for authorization to contact the call recipient, and a determination by the service provider computing system 106 that entity 5 is in the same category as the other members of trust network 2 (i.e., entity 4 in FIG. 5A) or otherwise related to or affiliated with the other members of trust network 2.

Referring to FIG. 5B, a caller ID trust user interface 542 is shown according to example embodiments. The user interface 542 is shown as a display on the recipient computing device 104. As shown by the bolded outline of the entities toggle 506, the entities toggle 506 is selected in FIG. 5B. Accordingly, the user interface 542 is an entities level user interface. While in the entities level user interface 542, the user can view entities authorized to contact the user. As shown in FIG. 5B, entities 1-5 (546) are listed, along with general toggle switches (548) corresponding to each entity. In user interface 542, entities 1, 2, and 4 are authorized to contact the call recipient, while entities 3 and 5 are not authorized. Entity 5 (570), as depicted in FIG. has been added to the list of entities based on a request received by service provider computing system 106 to authorize entity 5 to contact the call recipient. Such a request may be made via, for example, activation of a request authorization/request affiliation link in a request GUI 836 in FIG. 8. In some implementations, when the link in GUI 836 us activated, the caller computing device 102 may transmit a message to the service provider computing system, and the request may be indicated via the service provider client application running on the recipient computing device 104.

User interface 542 additionally allows for control over whether each entity may deliver items (e.g., text, images, sounds, and/or documents) to the recipient computing device 104 via the service provider computing system 106. Entity 1 has an item delivery selection 554 with a toggle switch 556 that is turned off (deactivated, disabled, unauthorized, etc.), and entity 2 has an item delivery selection 558 with a toggle switch 560 that is turned on (activated, enabled, authorized, etc.). If toggle switch 556/558 is turned off for an entity, then optional inclusions region 812 may be removed, deactivated, grayed out, or otherwise not available in a caller interface 800 displayed by a corresponding caller computing device 102 of the entity, and the authenticate/transmit link in GUI 830 may be selectable for authentication but not for transmission/delivery of items. The list of available options under each entity may be viewed/hidden using expander icons 562, 564. Because the options under entity 1 have been expanded and thus viewable, the expander icon 562 shows a "minus" sign to allow the user to hide the list under entity 1, and because the options under entity 3 are hidden and thus not viewable, expander icon 564 shows a "plus" sign to allow the user to expand the list under entity 3.

Although not shown in FIG. 5B, user interface 542 may also be configured to allow the user to control what items (e.g., which types of items from among text, images, documents, sounds, etc.) may be delivered to the recipient computing device 104 via the service provider computing system 106. For example, in various embodiments, if the list under entity 1 is expanded using expander icon 562, the list under entity 1 may identify the types of items that may be delivered by entity 1 to the recipient computing device 104. The list may include, for example, text, images, documents, and sounds.

In some implementations, one or more item types listed may have a corresponding toggle switch to allow the user to turn on or off the option for the caller to deliver the corresponding item type. In certain implementations, the user may not be allowed to toggle certain item types "on" (such that no active toggle switch is available) if, for example, the corresponding entity does not have the capability, need, or desire to deliver items of that type to the user. In some embodiments, the user may not be allowed to toggle certain item types "off" (such that no active toggle switch is available) if, for example, the caller (if authorized) must also be allowed to deliver certain item types. This may occur if, for example, an entity requires that, if a user authorizes the caller to contact the user, the user must also accept a certain item (e.g., a symbol) to be transmitted for presentation to the user to impart additional confidence or garner trust.

In some versions, the item types may alternatively be presented under "item delivery" (rather than under the "entity" designation). A toggle switch may be provided for item delivery as a whole to allow for wholesale activation or deactivation of delivery of any item type from the corresponding entity. Alternatively or additionally, toggle switches may be provided for each item type, such that if item delivery in general is enabled, particular item types may be individually restricted or allowed using corresponding item type toggle switches. In some implementations, an expander icon may be provided to expand/hide the list of item types under "item delivery."

Figures 6A, 6B:
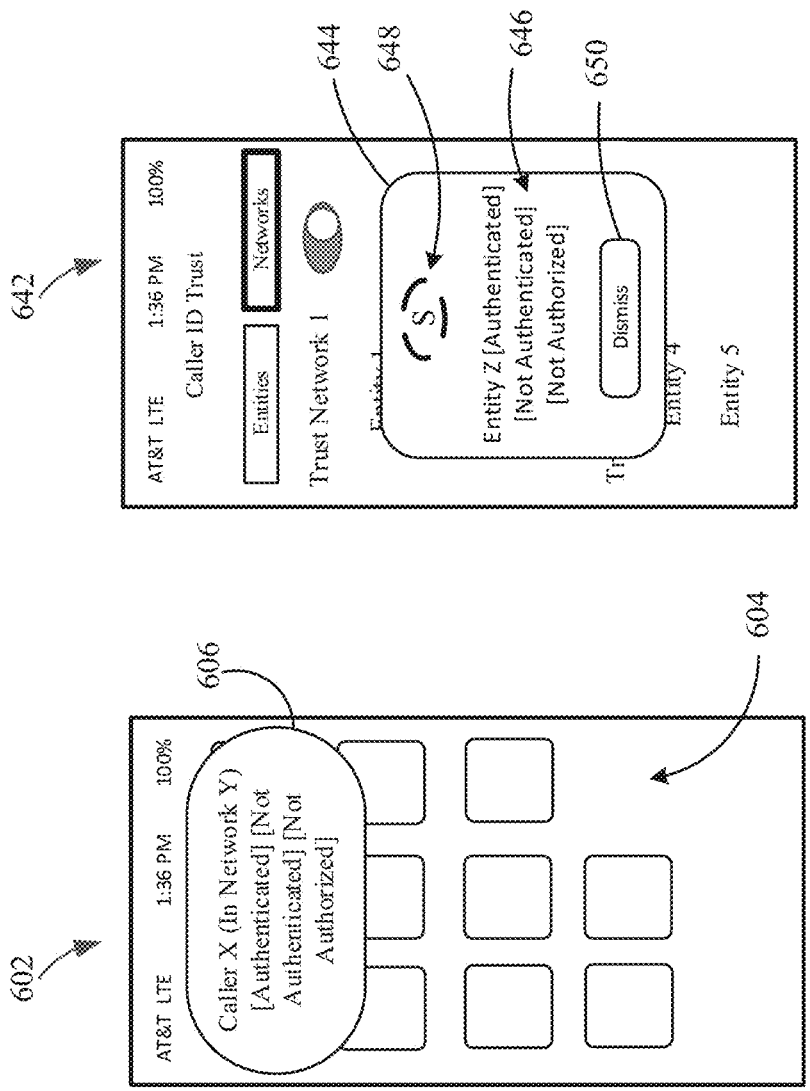
FIG. 6A is a user interface presented by a recipient computing device, according to example embodiments.
FIG. 6B is a user interface presented by a recipient computing device, according to example embodiments.

FIGS. 6A and 6B illustrate two potential ways in which a recipient device 104 can present notifications and alerts. As discussed above, notifications can be presented, for example, as in-application notifications and push notifications. In FIG. 6A, user interface 602 depicts a "home page" 604 (i.e., a default screen without any applications visible in the foreground) of the recipient device 104. A banner 606 (which may be persistent, or may be temporary, visible for only a short period, such as several seconds or minutes) is shown. The banner 606 is displayed after the recipient device 104 receives a transmission from the service provider computing system 106 indicating that a caller has been verified. In some implementations, the service provider computing system 106 transmits a result of the authentication only if the caller has been verified. In other implementations, the service provider computing system 106 transmits the result of the authentication even if the caller has not been verified (e.g., a result of authenticated or a result of not authenticated). In various embodiments, banner 606 may indicate the name of the caller, may identify a trust network associated with the caller, and/or may present images or otherwise provide other information/items. The banner 606 may also indicate, for example, that the caller has not been authenticated and/or whether the caller is currently authorized to call.

In FIG. 6B, user interface 642 depicts a screenshot of the caller IT trust application (e.g., an application 128 provided by the service provider computing system 106). A pop-up notification 644 may be displayed after the recipient device 104 receives a transmission from the service provider computing system 106 indicating that a caller has been verified. In certain implementations, the service provider computing system 106 transmits an indication of verification only if the caller has been verified. In some implementations, the service provider computing system 106 transmits an indication of whether authentication was successful (i.e., the result) even if the caller is not verified. In various embodiments, notification 644 may indicate, at region 646, the name of the caller, and/or may identify a trust network associated with the caller. Region 646 may also indicate, for example, that the caller has not been authenticated and/or whether the caller is currently authorized to call.

As shown, notification 644 in FIG. 6B has popped up while the networks toggle 504 is selected, but the client application can be configured to display pop-up notification 644 as soon as an indication of authentication is received from the service provider computing system 106, regardless of what screen/page is being displayed by the client application at the time. In some implementations, rather than using a pop-up notification, the client application may be configured to display the result of an authentication when the user makes a selection (via, e.g., activation of a link presented as part of a GUI) to view an authentication result at, for example, a home page or other page or screen of the client application. The client application may additionally or alternatively show authentication results when the user navigates to a certain page or section of the client application that shows results of the current and/or past authentication requests (e.g., an authentication history results page/section).

In various embodiments, notification 644 may include a symbol 648, which may be, for example, a logo of the caller. Notification 644 may also provide a dismiss icon 650 which, when selected, removes or minimizes the notification 644 to allow the user to return to the caller ID trust application. In certain embodiments, the notification 644 may allow the user to access additional content, such as optional items transmitted to the service provider computing system 106 by caller computing device 102. The additional content may be accessible by, for example, selection of a link that causes the item to be displayed or otherwise presented via, for example, a display, speaker, etc. In certain implementations, the amount of force used to press on a notification displayed on a touchscreen can result in the presentation of additional perceptible elements. For example, pressing down on and holding the notification 644 (e.g., at a region other than at dismiss icon 650) can result in additional text or imagery to be presented via the display. In some implementations, selection of a link redirects the user to a viewer in the caller ID trust application that allows the user to review materials (e.g., text messages, images, documents, etc.). In certain implementations, text messages, images, and documents (or sections and/or thumbnail representations thereof) may also be included in notification 644.

FIGS. 7A and 7B illustrate two potential user interfaces that may be provided via a service provider client application running on a recipient computing device 104. In FIG. 7A, user interface 702 provides authentication details for an entity requesting authentication (entity 6 in FIG. 7A). User interface 702 may include, for example, caller section 704 with caller details 706, affiliation/authorization details 710, call initiation time/date 714, authentication request time/date 718, and items delivered/accessible section 722, which may include a delivered code 726 (such as a code entered into text box 816 and/or generated via code generation icon 824) and delivered/accessible computer files 730 (e.g., audio, images, video, documents, etc.). The caller details 706 may, for example, identify the person calling, the caller's organization, the speaker's role in the organization, and/or the organization's address and phone number. In various implementations, certain caller details 706 may be retrieved from data repository 138 and certain caller details 706 may be received from the caller computing device 102 (e.g., in the message received by the service provider computing system 106). The affiliation/authorization details 710 may, for example, identify a trusted network with which the caller is associated, if any, and/or may provide information on whether or when the call recipient authorized the caller to call the call recipient on the telephone. The call initiation time/date 714 may identify, for example, when the call was initiated via initiation GUI 804, and the call authorization time/date 718 may identify, for example, when the link in GUI 830 was activated via caller computing device 102 to begin authentication of the caller. In various implementations, the time in authentication time/date 718 may be before or after the time in initiation time/date 714. Review of the time in authentication time/date 718 relative to the time in initiation time/date 714 may be used by the call recipient to help verify that the caller on the telephone is the caller who has authenticated himself or herself via the service provider computing system 106.

In FIG. 7B, a user interface 742 allows for review of items delivered or otherwise made accessible by an entity (in FIG. 7B, by entity 6). User interface 742 includes a text section 746 with delivered text 750, such as a catchphrase or code (which may also be spoken by the caller or the call recipient during the call). User interface 742 may also include an audio section 754 with audio files 758, such as an audio recording of a portion of the call (delivered/made accessible as, e.g., "Clip_from_call.mp3") or other sounds (spoken words, music, jingles, etc.). Similarly, an images/video section 762 may identify images and video files delivered or made accessible. A documents section 766 may list document files 770 delivered or made accessible, which may be in any suitable format (e.g., PDFs, word processing files, presentations, spreadsheets, etc.). A list of files with audio, imagery, video, and documentation may be provided via delivered/accessible computer files 730 in user interface 702. Selecting a file or item via user interface 702 or user interface 742 may launch the document from within user interface 702 or 742, respectively, may launch another user interface in the service provider client application, and/or may launch another application, such as a document viewer, media player, web browser, etc.

Referring to FIG. 8, a caller interface 800 is shown according to example embodiments. The caller interface 800 is shown as a display on the caller computing device 102 of entity 2. The caller interface 800 includes a call recipient region 802 that identifies the user to be called. Call recipient region 802 also provides a link as part of initiation GUI 804 that is selectable to generate a signal to the caller computing device 102 to indicate to the caller computing device 102 that the caller wishes to have the caller computing device 102 initiate a telephone call to the identified recipient. Caller interface 800 may also include a reasons/script region 806, which may identify what to say/discuss. An affiliations region 808 may identify a trust network to which the caller belongs, and/or may otherwise indicate how the call recipient is related or known to the caller computing device 102. Caller interface 800 also includes an alerts region 810 to provide alerts and notifications received by the caller computing device 102 from the service provider computing system 106. As discussed above, alerts may indicate, for example, that authentication failed or was successful, that the caller should confirm the identity of the call recipient, that the caller is not authorized, that a prior authorization has been revoked, and so forth.

In optional inclusions region 812, the caller may identify text, images, and/or documents to be transmitted to the recipient computing device 104. A text selector 814 allows the caller to select from a list of predefined/standard messages in a drop-down menu (as indicated by the down-pointing arrow). Alternatively or additionally, a custom message may be entered into text box 816. An image selector 818 allows the caller to select from a list of available images in a corresponding drop-down menu. In certain implementations, the images may be identified by name and/or by thumbnail. In some implementations, the caller can select to identify a new image file by, for example, selecting an image file stored in a location in memory that is accessible to the caller computing device 102. A document selector 820 allows the caller to select from a list of available documents in a corresponding drop-down menu. In certain implementations, the documents may be identified by name and/or by thumbnail. In some implementations, the caller can select to identify a new document file by, for example, selecting a file stored in a location in memory that is accessible to the caller computing device 102. In other implementations, optional inclusions region 812 may allow the caller to select other perceptible elements, such as sounds, vibrations of a selected pattern or intensity, or other items.

The authenticate/transmit link in GUI 830 allows the caller to authenticate himself or herself, and/or to have the service provider computing system 106 transmit items to the recipient computing device 104. In various embodiments, selection of the link (via, e.g., a touchscreen, mouse pointer, digital stylus, etc.) generates a signal to the caller computing device 102 (e.g., to application 118) to indicate that the user wishes to authenticate himself/herself and/or to deliver items to the recipient device 104. Receipt of the signal may, for example, cause the application 118 to transmit a message to the service provider computing system 106 (e.g., an API call), as discussed above. The message may be accompanied by the items identified via optional inclusions region 812. If the caller has already authenticated himself/herself, the link in GUI 830 may be used to deliver select items separately from the authentication process.

In various embodiments, the recipient computing device 104 may be used to deliver items to the caller computing device 102 via the service provider computing system 106. For example, the service provider client application may provider one or more user interfaces with functionality analogous to the functionality provided via caller interface 800 (e.g., via optional inclusions GUI 812 and/or via record GUI 840). Such user interfaces may allow the recipient computing device 104, for example, to deliver various text, sounds, imagery, video, or documentation to the caller computing device 102. Items delivered/made accessible may be generated or created before the telephone call is initiated and/or during the telephone call. In various implementations, such a user interface may provide an activatable link (e.g., a link presented visually via one or more user interfaces 126) that allows the call recipient to select a file accessible to the recipient computing device 104 for delivery. Activation of the link may, for example, launch an interface for selecting an item in a particular application that allows for creation or management of audiovisual material (e.g., a camera application, a photo library, a voice memorandum application, or a notes application) or a file storage/hosting/synchronization service (e.g., "Dropbox" or "Google Drive"). In certain implementations, the service provider client application may provide an activatable link for recording ambient sounds via a microphone or taking a photograph via a camera to allow the user to, for example, deliver a photograph of the user's driver's license, a photograph of a signed document, a recording of the user providing verbal authorization for the caller to perform an action, and so forth.

In alternative embodiments, the above approach could be used to verify senders of e-mails. For example, in certain implementations, the "caller" could instead be a "sender" of an e-mail. The sender could be authorized to send e-mails similar to callers being authorized to place telephone calls as discussed above. In certain implementations, an e-mail application or filter could identify (or filter out) e-mails from unauthorized senders. In other embodiments, the above approach could be used to demonstrate the integrity of websites. A user could, for example, request that a website be authenticated as a call is authenticated above. In certain implementations, authentication may be requested while the user is visiting the website, or before the user visits the website.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C.§ 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A service provider computing system comprising a processor configured to:
   receive, after a call recipient answers a telephone call from a telephone caller, a message transmitted by a caller device of the telephone caller, the message including a credential of the telephone caller and an identification of the call recipient;
   authenticate the telephone caller based on the received message; and
   transmit, during the telephone call, an instruction to a user device associated with the call recipient, the instruction configured to cause generation by the user device of a perceptible notification (i) indicating that the telephone caller is authenticated and (ii) including at least one of a time corresponding to initiation of the telephone call from the telephone caller or a time corresponding to receipt of the message by the service provider computing system.

2. The system of claim 1, wherein the message is an API call made by the caller device.

3. The system of claim 1, wherein the processor is further configured to generate a security token unique to the call recipient and transmit the security token to the caller device.

4. The system of claim 1, wherein the processor is further configured to identify the user device associated with the call recipient based on the received message.

5. The system of claim 1, wherein the processor is further configured to validate an identity of the call recipient before transmitting the instruction.

6. The system of claim 5, wherein the message comprises a security token, and wherein validating the identity of the call recipient comprises validating the security token.

7. The system of claim 1, wherein the transmitted instruction is configured to cause generation of an in-application notification viewable, via one or more user interfaces of the user device, from within a service provider client application running on the user device.

8. The system of claim 1, wherein the transmitted instruction is configured to cause generation of a push notification viewable via one or more user interfaces of the user device.

9. The system of claim 1, wherein the processor is further configured to:
   determine that the call recipient has authorized communications from the telephone caller; and
   transmit the instruction responsive to determining that the call recipient has authorized communications from the telephone caller.

10. The system of claim 9, wherein authorization for communications from the telephone caller is received from the user device via selection of a name of the telephone caller.

11. The system of claim 9, wherein authorization for communications from the telephone caller is received from the user device via selection of a category of the telephone caller.

12. The system of claim 1, wherein the perceptible notification includes at least one of a logo authorized by the telephone caller, a text approved by the telephone caller, or a symbol associated with the telephone caller.

13. The system of claim 1, wherein the received message includes a device identifier, and wherein identifying the user device comprises determining that the device identifier corresponds to the user device of the call recipient.

14. The system of claim 1, wherein the message includes an audio portion of the telephone call recorded by the caller device.

15. The system of claim 1, wherein the message includes a phrase or code spoken by the call recipient and received by the caller during the call.

16. A method comprising:
   receiving a message from a caller computing device of a telephone caller, the message including a credential of the telephone caller and an identification of a call recipient;
   authenticating the telephone caller based on the received message; and
   transmitting an instruction configured to cause generation by a user computing device associated with the call recipient of a perceptible notification (i) indicating that the telephone caller is authenticated and (ii) including at least one of a time corresponding to initiation of a telephone call from the telephone caller or a time corresponding to receiving the message;
   wherein the message is received from the caller computing device after the call recipient answers the telephone call from the telephone caller, and wherein the instruction is transmitted during the telephone call.

17. The method of claim 16, further comprising identifying the user device associated with the call recipient based on the received message.

18. The method of claim 13, wherein the user computing device is a smartphone on which the telephone call is received, and wherein the transmitted instruction causes generation of the perceptible notification by the smartphone.

19. The method of claim 13, wherein the identified user computing device is a separate device from a telephone device through which the telephone call is received by the call recipient.

20. A method comprising:
   receiving, after a call recipient answers a telephone call from a telephone caller, a message from a caller computing device of the telephone caller, the message including a credential of the telephone caller and an identification of the call recipient;
   authenticating the telephone caller based on the received message;
   determining that the call recipient has authorized communications from the telephone caller, wherein authorization for communications from the telephone caller is received from a user computing device via selection of at least one of (i) a name of the telephone caller or (ii) a category of the telephone caller; and transmitting, during the telephone call, only if the call recipient has authorized communications from the telephone caller, an instruction configured to cause generation by the first user computing device of a perceptible notification indicating that the telephone caller is authenticated.

\* \* \* \* \*